(12) United States Patent
Ulm

(10) Patent No.: US 8,654,640 B2
(45) Date of Patent: Feb. 18, 2014

(54) SYSTEM AND METHOD FOR IP VIDEO DELIVERY USING DISTRIBUTED FLEXIBLE CHANNEL BONDING

(75) Inventor: John Ulm, Pepperell, MA (US)

(73) Assignee: General Instrument Corporation, Horsham, PA (US)

( * ) Notice: Subject to any disclaimer, the term of this patent is extended or adjusted under 35 U.S.C. 154(b) by 332 days.

(21) Appl. No.: 12/963,152

(22) Filed: Dec. 8, 2010

(65) Prior Publication Data

US 2012/0147751 A1    Jun. 14, 2012

(51) Int. Cl.
*G01R 31/08* (2006.01)
*H04L 12/28* (2006.01)
*H04L 12/66* (2006.01)
*H04N 7/173* (2011.01)

(52) U.S. Cl.
USPC ........... 370/232; 370/395.4; 370/352; 725/97

(58) Field of Classification Search
USPC ........... 370/352, 400, 394, 468, 395.21, 389, 370/392, 230–236, 395.4, 485–487; 725/82, 86–88, 98, 105, 111, 114, 115, 725/118, 109; 709/203, 208, 217, 223, 226
See application file for complete search history.

(56) References Cited

U.S. PATENT DOCUMENTS

| | | |
|---|---|---|
| 3,838,221 A | 9/1974 | Schmidt et al. |
| 4,245,342 A | 1/1981 | Entenman |
| 4,385,392 A | 5/1983 | Angell et al. |
| 4,811,360 A | 3/1989 | Potter |
| 4,999,787 A | 3/1991 | McNally et al. |
| 5,228,060 A | 7/1993 | Uchiyama |
| 5,251,324 A | 10/1993 | McMullan |
| 5,271,060 A | 12/1993 | Moran et al. |
| 5,278,977 A | 1/1994 | Spencer et al. |
| 5,347,539 A | 9/1994 | Sridhar et al. |

(Continued)

FOREIGN PATENT DOCUMENTS

| | | |
|---|---|---|
| DE | 69631420 T2 | 12/2004 |
| EP | 0905998 A2 | 3/1999 |

(Continued)

OTHER PUBLICATIONS

Patrick & Joyce, Delivering Economical IP Video over DOCSIS by Bypassing the M-CMTS with DIBA, SCTE 2007 Emerging Technologies, Topic Subject: Service Velocity & Next Generation Architectures: How Do We Get There?, 2007.

(Continued)

*Primary Examiner* — Hanh N Nguyen
(74) *Attorney, Agent, or Firm* — Stewart M. Wiener

(57) ABSTRACT

A system and method receives IP packets on a first device for delivery as DOCSIS packets over a DOCSIS interface, each DOCSIS packet encapsulating IP data from the IP packets, and including a sequence number that the first device generates for a bonding group. The method delivers first DOCSIS packets to a DOCSIS device using first downstream channels on the first device that are associated with the bonding group. When the first downstream channels exceed a capacity, the method determines an available capacity of second downstream channels on a second device that are associated with the bonding group, identifies second DOCSIS packets that do not exceed the available capacity, and forwards the second DOCSIS packets to the second device, which delivers the second DOCSIS packets to the DOCSIS device using the second downstream channels.

20 Claims, 4 Drawing Sheets

(56) References Cited

U.S. PATENT DOCUMENTS

| | | |
|---|---|---|
| 5,390,339 A | 2/1995 | Bruckert et al. |
| 5,463,661 A | 10/1995 | Moran et al. |
| 5,532,865 A | 7/1996 | Utsumi et al. |
| 5,557,603 A | 9/1996 | Barlett et al. |
| 5,606,725 A | 2/1997 | Hart |
| 5,631,846 A | 5/1997 | Szurkowski |
| 5,692,010 A | 11/1997 | Nielsen |
| 5,694,437 A | 12/1997 | Yang et al. |
| 5,732,104 A | 3/1998 | Brown et al. |
| 5,790,523 A | 8/1998 | Ritchie et al. |
| 5,862,451 A | 1/1999 | Grau et al. |
| 5,867,539 A | 2/1999 | Koslov |
| 5,870,429 A | 2/1999 | Moran et al. |
| 5,886,749 A | 3/1999 | Williams et al. |
| 5,939,887 A | 8/1999 | Schmidt et al. |
| 5,943,604 A | 8/1999 | Chen et al. |
| 6,032,019 A | 2/2000 | Chen et al. |
| 6,061,393 A | 5/2000 | Tsui et al. |
| 6,108,351 A | 8/2000 | Hardy et al. |
| 6,154,503 A | 11/2000 | Strolle |
| 6,229,792 B1 | 5/2001 | Anderson et al. |
| 6,230,326 B1 | 5/2001 | Unger et al. |
| 6,233,274 B1 | 5/2001 | Tsui et al. |
| 6,240,553 B1 | 5/2001 | Son et al. |
| 6,272,150 B1 | 8/2001 | Hrastar et al. |
| 6,278,730 B1 | 8/2001 | Tsui et al. |
| 6,308,286 B1 | 10/2001 | Richmond et al. |
| 6,310,909 B1 | 10/2001 | Jones |
| 6,321,384 B1 | 11/2001 | Eldering |
| 6,330,221 B1 | 12/2001 | Gomez |
| 6,334,219 B1 | 12/2001 | Hill et al. |
| 6,377,552 B1 | 4/2002 | Moran et al. |
| 6,385,773 B1 | 5/2002 | Schwartzman et al. |
| 6,389,068 B1 | 5/2002 | Smith et al. |
| 6,434,583 B1 | 8/2002 | Dapper et al. |
| 6,445,734 B1 | 9/2002 | Chen et al. |
| 6,456,597 B1 | 9/2002 | Bare |
| 6,459,703 B1 | 10/2002 | Grimwood et al. |
| 6,477,197 B1 | 11/2002 | Unger |
| 6,480,469 B1 | 11/2002 | Moore et al. |
| 6,483,033 B1 | 11/2002 | Simoes et al. |
| 6,498,663 B1 | 12/2002 | Farhan et al. |
| 6,512,616 B1 | 1/2003 | Nishihara |
| 6,526,260 B1 | 2/2003 | Hick et al. |
| 6,546,557 B1 | 4/2003 | Ovadia |
| 6,556,239 B1 | 4/2003 | Al Araji et al. |
| 6,556,562 B1 | 4/2003 | Bhagavath et al. |
| 6,556,660 B1 | 4/2003 | Li et al. |
| 6,559,756 B2 | 5/2003 | Al Araji et al. |
| 6,563,868 B1 | 5/2003 | Zhang et al. |
| 6,570,394 B1 | 5/2003 | Williams |
| 6,570,913 B1 | 5/2003 | Chen |
| 6,574,797 B1 | 6/2003 | Naegeli et al. |
| 6,588,016 B1 | 7/2003 | Chen et al. |
| 6,606,351 B1 | 8/2003 | Dapper et al. |
| 6,611,795 B2 | 8/2003 | Cooper |
| 6,646,677 B2 | 11/2003 | Noro et al. |
| 6,662,135 B1 | 12/2003 | Burns et al. |
| 6,662,368 B1 | 12/2003 | Cloonan et al. |
| 6,671,334 B1 | 12/2003 | Kuntz et al. |
| 6,687,632 B1 | 2/2004 | Rittman |
| 6,690,655 B1 | 2/2004 | Miner et al. |
| 6,700,875 B1 | 3/2004 | Schroeder et al. |
| 6,700,927 B1 | 3/2004 | Esliger et al. |
| 6,711,134 B1 | 3/2004 | Wichelman et al. |
| 6,741,947 B1 | 5/2004 | Wichelman et al. |
| 6,748,551 B2 | 6/2004 | Furudate et al. |
| 6,757,253 B1 | 6/2004 | Cooper et al. |
| 6,772,388 B2 | 8/2004 | Cooper et al. |
| 6,772,437 B1 | 8/2004 | Cooper et al. |
| 6,775,840 B1 | 8/2004 | Naegel et al. |
| 6,816,463 B2 | 11/2004 | Cooper et al. |
| 6,839,829 B1 | 1/2005 | Daruwalla et al. |
| 6,853,932 B1 | 2/2005 | Wichelman et al. |
| 6,877,166 B1 | 4/2005 | Roeck et al. |
| 6,895,043 B1 | 5/2005 | Naegeli et al. |
| 6,895,594 B1 | 5/2005 | Simoes et al. |
| 6,906,526 B2 | 6/2005 | Hart et al. |
| 6,928,475 B2 | 8/2005 | Schenkel et al. |
| 6,944,881 B1 | 9/2005 | Vogel |
| 6,961,314 B1 | 11/2005 | Quigley et al. |
| 6,961,370 B2 | 11/2005 | Chappell |
| 6,967,994 B2 | 11/2005 | Boer et al. |
| 6,973,141 B1 | 12/2005 | Isaksen et al. |
| 6,985,437 B1 | 1/2006 | Vogel |
| 6,999,408 B1 | 2/2006 | Gomez |
| 7,002,899 B2 | 2/2006 | Azenkot et al. |
| 7,010,002 B2 | 3/2006 | Chow et al. |
| 7,017,176 B1 | 3/2006 | Lee et al. |
| 7,032,159 B2 | 4/2006 | Lusky et al. |
| 7,039,939 B1 | 5/2006 | Millet et al. |
| 7,050,419 B2 | 5/2006 | Azenkot et al. |
| 7,054,554 B1 | 5/2006 | McNamara et al. |
| 7,058,007 B1 | 6/2006 | Daruwalla et al. |
| 7,072,365 B1 | 7/2006 | Ansley |
| 7,079,457 B2 | 7/2006 | Wakabayashi et al. |
| 7,099,412 B2 | 8/2006 | Coffey |
| 7,099,580 B1 | 8/2006 | Bulbul |
| 7,139,283 B2 | 11/2006 | Quigley et al. |
| 7,142,609 B2 | 11/2006 | Terreault et al. |
| 7,152,025 B2 | 12/2006 | Lusky et al. |
| 7,158,542 B1 | 1/2007 | Zeng et al. |
| 7,164,694 B1 | 1/2007 | Nodoushani et al. |
| 7,177,324 B1 | 2/2007 | Choudhury et al. |
| 7,197,067 B2 | 3/2007 | Lusky et al. |
| 7,222,255 B1 | 5/2007 | Claessens et al. |
| 7,227,863 B1 | 6/2007 | Leung et al. |
| 7,242,862 B2 | 7/2007 | Saunders et al. |
| 7,246,368 B1 | 7/2007 | Millet et al. |
| 7,263,123 B2 | 8/2007 | Yousef |
| 7,274,735 B2 | 9/2007 | Lusky et al. |
| 7,295,518 B1 | 11/2007 | Monk et al. |
| 7,315,573 B2 | 1/2008 | Lusky et al. |
| 7,315,967 B2 | 1/2008 | Azenko et al. |
| 7,400,677 B2 | 7/2008 | Jones |
| 7,421,276 B2 | 9/2008 | Steer et al. |
| 7,451,472 B2 | 11/2008 | Williams |
| 7,492,703 B2 | 2/2009 | Lusky et al. |
| 7,554,902 B2 | 6/2009 | Kim et al. |
| 7,573,884 B2 | 8/2009 | Klimker et al. |
| 7,573,935 B2 | 8/2009 | Min et al. |
| 7,584,298 B2 | 9/2009 | Klinker et al. |
| 7,616,654 B2 | 11/2009 | Moran et al. |
| 7,650,112 B2 | 1/2010 | Utsumi et al. |
| 7,672,310 B2 | 3/2010 | Cooper et al. |
| 7,684,315 B1 | 3/2010 | Beser |
| 7,684,341 B2 | 3/2010 | Howald |
| 7,693,090 B1 | 4/2010 | Kimpe |
| 7,716,712 B2 | 5/2010 | Booth et al. |
| 7,739,359 B1 | 6/2010 | Millet et al. |
| 7,742,697 B2 | 6/2010 | Cooper et al. |
| 7,742,771 B2 | 6/2010 | Thibeault |
| 7,760,624 B1 | 7/2010 | Goodson et al. |
| 7,778,314 B2 | 8/2010 | Wajcer et al. |
| 7,787,557 B2 | 8/2010 | Kim et al. |
| 7,792,183 B2 | 9/2010 | Massey et al. |
| 7,856,049 B2 | 12/2010 | Currivan et al. |
| 7,876,697 B2 | 1/2011 | Thompson et al. |
| 7,953,144 B2 | 5/2011 | Allen et al. |
| 7,970,010 B2 | 6/2011 | Denney et al. |
| 8,000,254 B2 | 8/2011 | Thompson et al. |
| 8,037,541 B2 | 10/2011 | Montague et al. |
| 8,040,915 B2 | 10/2011 | Cummings |
| 8,059,546 B2 * | 11/2011 | Pai et al. .................. 370/236 |
| 8,081,674 B2 | 12/2011 | Thompson et al. |
| 8,116,360 B2 | 2/2012 | Thibeault |
| 8,265,559 B2 | 9/2012 | Cooper et al. |
| 8,284,828 B2 | 10/2012 | Cooper et al. |
| 8,345,557 B2 | 1/2013 | Thibeault et al. |
| 2001/0055319 A1 | 12/2001 | Quigley et al. |
| 2002/0038461 A1 | 3/2002 | White et al. |
| 2002/0044531 A1 | 4/2002 | Cooper et al. |
| 2002/0091970 A1 | 7/2002 | Furudate et al. |
| 2002/0116493 A1 | 8/2002 | Schenkel et al. |

(56) References Cited

U.S. PATENT DOCUMENTS

| | | |
|---|---|---|
| 2002/0154620 A1 | 10/2002 | Azenkot et al. |
| 2002/0168131 A1 | 11/2002 | Walter et al. |
| 2002/0181395 A1 | 12/2002 | Foster et al. |
| 2003/0028898 A1 | 2/2003 | Howald |
| 2003/0043732 A1 | 3/2003 | Walton et al. |
| 2003/0067883 A1 | 4/2003 | Azenkot et al. |
| 2003/0101463 A1 | 5/2003 | Greene et al. |
| 2003/0108052 A1 | 6/2003 | Inoue et al. |
| 2003/0120819 A1 | 6/2003 | Abramson et al. |
| 2003/0138250 A1 | 7/2003 | Glynn |
| 2003/0149991 A1 | 8/2003 | Reidhead et al. |
| 2003/0158940 A1 | 8/2003 | Leigh |
| 2003/0179768 A1 | 9/2003 | Lusky et al. |
| 2003/0179770 A1 | 9/2003 | Reznic et al. |
| 2003/0179821 A1 | 9/2003 | Lusky et al. |
| 2003/0181185 A1 | 9/2003 | Lusky et al. |
| 2003/0182664 A1 | 9/2003 | Lusky et al. |
| 2003/0185176 A1 | 10/2003 | Lusky et al. |
| 2003/0188254 A1 | 10/2003 | Lusky et al. |
| 2003/0200317 A1 | 10/2003 | Zeitak et al. |
| 2003/0212999 A1 | 11/2003 | Cai |
| 2004/0015765 A1 | 1/2004 | Cooper et al. |
| 2004/0042385 A1 | 3/2004 | Kim et al. |
| 2004/0047284 A1 | 3/2004 | Eidson |
| 2004/0052356 A1 | 3/2004 | McKinzie et al. |
| 2004/0062548 A1 | 4/2004 | Obeda et al. |
| 2004/0073937 A1 | 4/2004 | Williams |
| 2004/0096216 A1 | 5/2004 | Ito |
| 2004/0109661 A1 | 6/2004 | Bierman et al. |
| 2004/0139473 A1 | 7/2004 | Greene |
| 2004/0163129 A1 | 8/2004 | Chapman et al. |
| 2004/0181811 A1 | 9/2004 | Rakib |
| 2004/0208513 A1 | 10/2004 | Peddanarappagari et al. |
| 2004/0233234 A1 | 11/2004 | Chaudhry et al. |
| 2004/0233926 A1 | 11/2004 | Cummings |
| 2004/0248520 A1 | 12/2004 | Miyoshi |
| 2004/0261119 A1 | 12/2004 | Williams et al. |
| 2005/0010958 A1 | 1/2005 | Rakib et al. |
| 2005/0025145 A1 | 2/2005 | Rakib et al. |
| 2005/0034159 A1 | 2/2005 | Ophir et al. |
| 2005/0039103 A1 | 2/2005 | Azenko et al. |
| 2005/0058082 A1 | 3/2005 | Moran et al. |
| 2005/0064890 A1 | 3/2005 | Johan et al. |
| 2005/0097617 A1 | 5/2005 | Currivan et al. |
| 2005/0108763 A1 | 5/2005 | Baran et al. |
| 2005/0122996 A1 | 6/2005 | Azenkot et al. |
| 2005/0163088 A1 | 7/2005 | Yamano et al. |
| 2005/0175080 A1 | 8/2005 | Bouillett |
| 2005/0183130 A1 | 8/2005 | Sadja et al. |
| 2005/0198688 A1 | 9/2005 | Fong |
| 2005/0226161 A1 | 10/2005 | Jaworski |
| 2005/0281200 A1 | 12/2005 | Terreault |
| 2006/0013147 A1 | 1/2006 | Terpstra et al. |
| 2006/0121946 A1 | 6/2006 | Walton et al. |
| 2006/0250967 A1 | 11/2006 | Miller et al. |
| 2006/0262722 A1 | 11/2006 | Chapman et al. |
| 2007/0002752 A1 | 1/2007 | Thibeault et al. |
| 2007/0058542 A1 | 3/2007 | Thibeault |
| 2007/0076592 A1 | 4/2007 | Thibeault et al. |
| 2007/0076789 A1 | 4/2007 | Thibeault |
| 2007/0076790 A1 | 4/2007 | Thibeault et al. |
| 2007/0086328 A1 | 4/2007 | Kao et al. |
| 2007/0094691 A1 | 4/2007 | Gazdzinski |
| 2007/0097907 A1 | 5/2007 | Cummings |
| 2007/0133672 A1 | 6/2007 | Lee et al. |
| 2007/0143654 A1 | 6/2007 | Joyce et al. |
| 2007/0147489 A1 | 6/2007 | Sun et al. |
| 2007/0177526 A1 | 8/2007 | Siripunkaw et al. |
| 2007/0184835 A1 | 8/2007 | Bitran et al. |
| 2007/0189770 A1 | 8/2007 | Sucharczuk et al. |
| 2007/0206600 A1* | 9/2007 | Klimker et al. ............... 370/394 |
| 2007/0206625 A1 | 9/2007 | Maeda |
| 2007/0211618 A1 | 9/2007 | Cooper et al. |
| 2007/0223512 A1 | 9/2007 | Cooper et al. |
| 2007/0223920 A1 | 9/2007 | Moore et al. |
| 2007/0245177 A1 | 10/2007 | Cooper et al. |
| 2008/0056713 A1 | 3/2008 | Cooper et al. |
| 2008/0062888 A1 | 3/2008 | Lusky et al. |
| 2008/0075157 A1 | 3/2008 | Allen et al. |
| 2008/0101210 A1 | 5/2008 | Thompson et al. |
| 2008/0125984 A1 | 5/2008 | Skendzic et al. |
| 2008/0140823 A1 | 6/2008 | Thompson et al. |
| 2008/0193137 A1 | 8/2008 | Thompson et al. |
| 2008/0200129 A1 | 8/2008 | Cooper et al. |
| 2008/0242339 A1 | 10/2008 | Anderson |
| 2008/0250508 A1 | 10/2008 | Montague et al. |
| 2008/0274700 A1 | 11/2008 | Li |
| 2008/0291840 A1 | 11/2008 | Cooper et al. |
| 2009/0031384 A1 | 1/2009 | Brooks et al. |
| 2009/0103557 A1 | 4/2009 | Hong et al. |
| 2009/0103669 A1 | 4/2009 | Kolze et al. |
| 2009/0109877 A1 | 4/2009 | Murray et al. |
| 2009/0249421 A1* | 10/2009 | Liu et al. ............... 725/116 |
| 2009/0252234 A1 | 10/2009 | Samdani et al. |
| 2010/0083356 A1 | 4/2010 | Steckley et al. |
| 2010/0095360 A1 | 4/2010 | Pavlovski et al. |
| 2010/0154017 A1 | 6/2010 | An et al. |
| 2010/0157824 A1 | 6/2010 | Thompson et al. |
| 2010/0158093 A1 | 6/2010 | Thompson et al. |
| 2010/0185391 A1 | 7/2010 | Lee et al. |
| 2010/0223650 A1 | 9/2010 | Millet et al. |
| 2010/0251320 A1 | 9/2010 | Shafer et al. |
| 2011/0026577 A1 | 2/2011 | Primo et al. |
| 2011/0030019 A1* | 2/2011 | Ulm et al. ............... 725/98 |
| 2011/0069745 A1 | 3/2011 | Thompson et al. |
| 2011/0072127 A1 | 3/2011 | Gerber et al. |
| 2011/0110415 A1 | 5/2011 | Cooper et al. |
| 2011/0153683 A1 | 6/2011 | Hoskinson |
| 2011/0194418 A1 | 8/2011 | Wolcott et al. |
| 2011/0194597 A1 | 8/2011 | Wolcott et al. |
| 2011/0197071 A1 | 8/2011 | Wolcott et al. |
| 2011/0243214 A1 | 10/2011 | Wolcott et al. |
| 2012/0054312 A1* | 3/2012 | Salinger ............... 709/219 |
| 2012/0084416 A1 | 4/2012 | Thibeault et al. |

FOREIGN PATENT DOCUMENTS

| | | |
|---|---|---|
| EP | 1235402 A2 | 8/2002 |
| EP | 1341335 A2 | 9/2003 |
| EP | 1956782 A1 | 8/2008 |
| JP | 55132161 A | 10/1980 |
| JP | 04208707 A | 7/1992 |
| JP | 6120896 A | 4/1994 |
| JP | 6177840 A | 6/1994 |
| JP | 09008738 A | 1/1997 |
| JP | 9162816 A | 6/1997 |
| JP | 10247893 A | 9/1998 |
| JP | 11230857 A | 8/1999 |
| JP | 2001044956 A | 2/2001 |
| JP | 2003530761 A | 10/2003 |
| JP | 2004172783 A | 6/2004 |
| JP | 2004343678 A | 12/2004 |
| WO | 0192901 A1 | 6/2001 |
| WO | 0233974 A1 | 4/2002 |
| WO | 2004062124 A1 | 7/2004 |
| WO | 2007046876 A1 | 4/2007 |
| WO | 2009146426 A1 | 12/2009 |

OTHER PUBLICATIONS

Sangeeta Ramakrishnam, "Scaling the DOCSIS Network for IPTV", Cisco Systems, Inc., SCTE Conference on Emerging Technologies and the NCTA Cable Show, 2009 (19 pages).

Xiaomei Liu and Alon Bernstein, "Variable Bit Rate Video Services in DOCSIS 3.0 Networks", NCTA Technical Papers, 2008 (12 pages).

Y.R. Shelke, "Knowledge Based Topology Discovery and Geo-localization", Thesis, Master of Science, Ohio State University, 2010.

R. Thompson, et al., "Practical Considerations for Migrating the Network Toward All-Digital", Society of Cable Telecommunications Engineers (SCTE) Cable-Tec Expo, Oct. 2009.

(56) References Cited

OTHER PUBLICATIONS

R. Thompson, et al., "Optimizing Upstream Throughput Using Equalization Coefficient Analysis", National Cable & Telecommunications Association (NCTA) Technical Papers, Apr. 2009.

R. L. Howald et al., "Characterizing and Aligning the HFC Return Path for Successful DOCSIS 3.0 Rollouts", SCTE Cable Tec Expo, Oct. 2009.

Campos, L.A., et al., "Pre-equalization based Pro-active Network Maintenance Methodology", Cable Television Laboratories, Inc., (presentation), 2008.

Cable Television Laboratories, Inc., "Pre-Equalization based pro-active network maintenance process model", Invention Disclosure 60177, Jun. 2008.

Cable Television Laboratories, Inc., "A Simple Algorithm for Fault Localization Using Naming Convention and Micro-reflection Signature," Invention Disclosure 60193, Jun. 2008.

Cable Television Laboratories, Inc., "Pre-Equalization Based Pro-active Network Maintenance Process Model for CMs Transmitting on Multiple Upstream Channels," Invention Disclosure 60203, May 2009.

PCT Search Report & Written Opinion, Re: Application #PCT/US2011/062048; Mar. 7, 2012.

PCT Search Report & Written Opinion, Re: Application #PCT/US2010/43364; Sep. 16, 2010.

Cable Television Laboratories, Inc., "Data-Over-Cable Service Interface Specifications DOCSIS 3.0: MAC and Upper Layer Protocols Interface," CM-SP-MULPIv3.0-I16-110623, section 8, pp. 242-266, Jun. 2011.

Cable Television Laboratories, Inc., "Data-Over-Cable Service Interface Specifications DOCSIS® 3.0—MAC and Upper Layer Protocols Interface Specification," CM-SP-MULPIv3.0-I17-111117, Nov. 2011.

Cable Television Laboratories, Inc., "DOCSIS® Best Practices and Guidelines: Proactive Network Maintenance Using Preequalization," CM-GL-PNMP-V01-100415, Apr. 2010.

Cable Television Laboratories, Inc., "DOCSIS® Best Practices and Guidelines: Proactive Network Maintenance Using Pre-equalization," CM-GL-PNMP-V02-110623, Jun. 2011.

Cable Television Laboratories, Inc., Data-Over-Cable Service Interface Specifications—DOCSIS 2.0: Radio Frequency Interface Specification, CM-SP-RFIv2.0-I06-040804, Aug. 2004.

R.L. Howald, et al., "Customized Broadband—Analysis Techniques For Blended Multiplexes," NCTA Technical Papers, 2002.

R. Howald, "Access Networks Solutions: Introduction to S-CDMA," Presentation to Society of Cable Telecommunications Engineers (SCTE) South Florida Chapter, 2009.

R. Howald, "Upstream Snapshots & Indicators (2009)," Regional Samples, Presentation to Society of Cable Telecommunications Engineers (SCTE) South Florida Chapter, Jan. 2010.

R. Howald, et al., "DOCSIS 3.0 Upstream: Readiness & Qualification," SCTE Cable-Tec Expo, Oct. 2009.

R. Howald, et al., "The Grown-Up Potential of a Teenage PHY", NCTA Convention and Exposition, May 2012.

R. Howald, "DOCSIS 3.0 Upstream: Technology, RF Variables & Case Studies," Access Networks Solutions, 2009, presentation to Society of Cable Telecommunications Engineers (SCTE) South Florida Chapter, 23 pages, Jan. 2010.

R. Hranac, "Linear Distortions, Part 1," Communication Technology, Jul. 2005.

Motorola, Inc., "White Paper: Expanding Bandwidth Using Advanced Spectrum Management," Sep. 25, 2003.

H. Newton, Newton's Telecom Dictionary, Flatiron Publishing, 9th ed., pp. 216 and 1023 (definitions of "carrier to noise ratio" and "signal to noise ratio"), Sep. 1995.

A. Pooper, et al., "An Advanced Receiver with Interference Cancellation for Broadband Cable Networks," International Zurich Seminar on Broadband Communications Access 2002, pp. 23-1 to 23-6, IEEE, 2002.

A. Popper, et al., "Ingress Noise Cancellation for the Upstream Channel in Broadband Cable Access Systems," International Conference on Communications 2002, vol. 3, pp. 1808-1812, IEEE, 2002.

S.U.H. Qureshi, "Adaptive Equalization," Proceedings of the IEEE, vol. 73, No. 9, pp. 1349-1387, Sep. 1985.

R. Thompson, et al., "256-QAM for Upstream HFC," NCTA 2010 Spring Technical Forum Proceedings, pp. 142-152, May 2010.

R. Thompson, et al., "256-QAM for Upstream HFC Part Two", SCTE Cable-Tec Expo 2011, Technical Paper, Nov. 2011.

R. Thompson, et al., "Multiple Access Made Easy," SCTE Cable-Tec Expo 2011, Technical Paper, Nov. 2011.

R. Thompson, et al., "64-QAM, 6.4MHz Upstream Deployment Challenges," SCTE Canadian Summit, Toronto, Canada, Technical Paper, Mar. 2011.

B. Volpe, et al., "Cable-Tec Expo 2011: Advanced Troubleshooting in a DOCSIS© 3.0 Plant," Nov. 2011.

L. Wolcott, "Modem Signal Usage and Fault Isolation," U.S. Appl. No. 61/301,835, filed Feb. 5, 2010.

F. Zhao, et al., "Techniques for minimizing error propagation in decision feedback detectors for recording channels," IEEE Transactions on Magnetics, vol. 37, No. 1, pp. 592-602, Jan. 2001.

Y. Morishita, et al., "An LMS adaptive equalizer using threshold in impulse noise environments", IEEE, ICT 2003 10th International Conference on Telecommunications, vol. 1, pp. 578-582, Feb. 2003.

\* cited by examiner

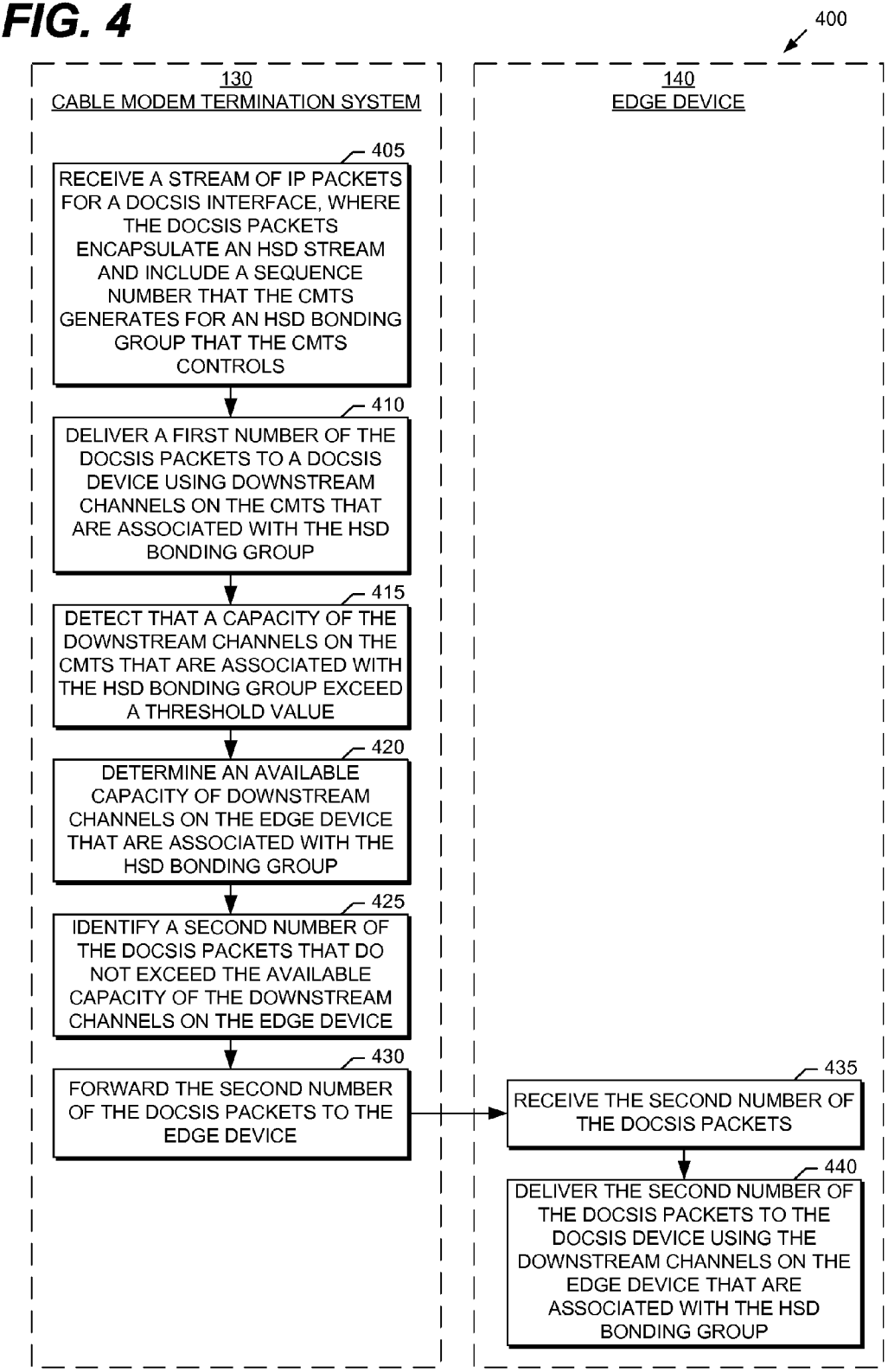

SYSTEM AND METHOD FOR IP VIDEO DELIVERY USING DISTRIBUTED FLEXIBLE CHANNEL BONDING

BACKGROUND

Data Over Cable Service Interface Specification (DOCSIS) 3.0 technology uses multiple bonded channels to enable services such as Internet Protocol (IP) video delivery. The video streams are typically delivered as multicast packets to a cable modem termination system (CMTS) and "switched" by the CMTS so that only the video streams that a customer is watching are actually sent down a DOCSIS downstream channel. Since the bandwidth required may exceed the capacity of the channel and drop packets, the prior art describes a variety of improvements to channel bonding to improve the quality of service.

The prior art also describes an innovation that overlaps bonding groups that span multiple channels. In this case, the CMTS scheduler implements instantaneous load balancing to schedule excess peak Variable Bit Rate (VBR) video on DOCSIS channels with extra capacity, or conversely to allow best effort High Speed Data (HSD) to utilize DOCSIS channels when the VBR video is in a "valley". The prior art describes load balancing across a bonding group that is within the control of a single CMTS entity; however, as IP video delivery over DOCSIS expands and scales, there are scenarios where the DOCSIS channels that are available to leverage are spread across multiple devices. In a first scenario, the deployed system uses a DOCSIS IP Television (IPTV) Bypass Architecture (DIBA) to send the IP video directly to an edge Quadrature Amplitude Modulator (EQAM) where it is encapsulated as a DOCSIS packet and sent directly to the user devices, thereby bypassing the CMTS. In the first scenario, the EQAM controls the IP video channels, while the CMTS controls the HSD channels. In a second scenario, multiple devices generate DOCSIS channels and broadcast those channels to user devices. For IP video broadcast delivery, a CMTS may use static multicast to deliver the IP video over DOCSIS channels to a large group of users that span many different service groups; while a different CMTS may provide the HSD and narrowcast video channels to a single service group.

There is a demand for an IP video delivery method and system to allocate DOCSIS flexibly sized bonding groups across multiple devices. The presently disclosed invention satisfies this demand.

SUMMARY

Aspects of the present invention provide a system and method receives Internet Protocol (IP) packets on a first device for delivery over a DOCSIS interface, each DOCSIS packet encapsulating IP data, and including a sequence number that the first device generates for a bonding group. The method delivers a first number of the DOCSIS packets to a DOCSIS device using first downstream channels on the first device that are associated with the bonding group. When a capacity of the first downstream channels is exceeded, the method determines an available capacity of second downstream channels on a second device that are associated with the bonding group, identifies a second number of the DOCSIS packets that do not exceed the available capacity on the second downstream channels, and forwards the second number of the DOCSIS packets to the second device, where the second device delivers the second number of the DOCSIS packets to the DOCSIS device using the second downstream channels.

Aspects of the present invention also describe the use of DOCSIS 3.0 bonding groups with an "instantaneous load balancing" algorithm to provide optimum utilization that is extensible to a distributed environment that spans multiple CMTS and/or DIBA devices. Specifically, the present invention implements multiple logical bonding groups that span the shared DOCSIS channels and that each CMTS and DIBA entity controls at least one of the bonding groups, thereby controlling the bonding sequence numbers for their respective bonding groups.

BRIEF DESCRIPTION OF THE DRAWINGS

FIG. 4 is a message flow diagram that illustrates a method according to one embodiment of the present invention.

DETAILED DESCRIPTION

Figure 1:
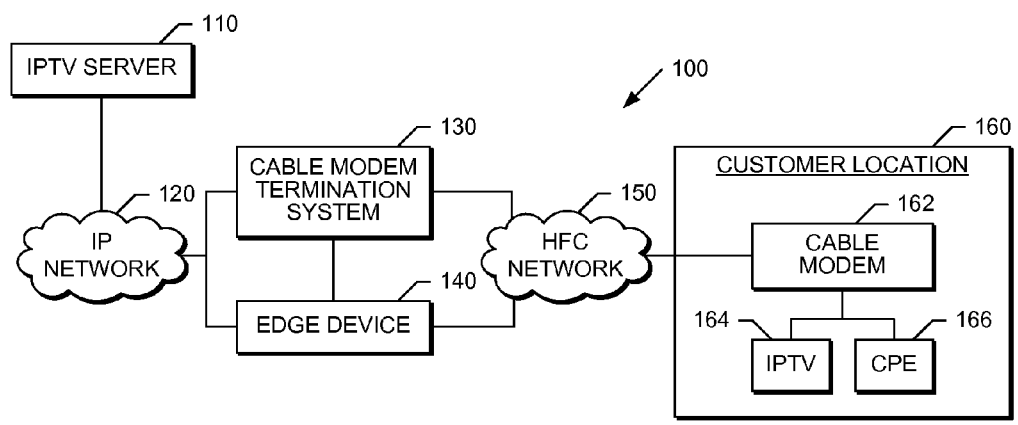
FIG. 1 is a network diagram that illustrates one embodiment of the hardware components of a system that performs the present invention.

FIG. 1 is a network diagram that illustrates one embodiment of the hardware components of a system that performs the present invention. FIG. 1 depicts an IP video delivery system 100 that includes an IPTV server 110, IP network 120, and hybrid fiber-coaxial (HFC) network 150. The IPTV server 110 is a streaming server that uses the IP protocol to deliver Video-on-Demand, Audio-on-Demand, and Pay-per-View streams to the IP network 120. The HFC network 150 is a data and video content network that connects a cable modem termination system (CMTS) 130 and edge device 140 to a customer location 160. The IP video delivery system 100 shown in FIG. 1 may include any number of interconnected IPTV server 110, IP network 120, CMTS 130, edge device 140, HFC network 150, and customer location 160.

The IP network 120, in one embodiment, is a public communication network or wide area network (WAN). The present invention also contemplates the use of comparable network architectures. Comparable network architectures include the Public Switched Telephone Network (PSTN), a public packet-switched network carrying data and voice packets, a wireless network, and a private network. A wireless network includes a cellular network (e.g., a Time Division Multiple Access (TDMA), Code Division Multiple Access (CDMA), or Orthogonal Frequency Division Multiplexing (OFDM) network), a satellite network, and a wireless Local Area Network (LAN) (e.g., a wireless fidelity (Wi-Fi) network). A private network includes a LAN, a Personal Area Network (PAN) such as a Bluetooth network, a wireless LAN, a Virtual Private Network (VPN), an intranet, or an extranet. An intranet is a private communication network that provides an organization such as a corporation, with a secure means for trusted members of the organization to access the resources on the organization's network. In contrast, an extranet is a private communication network that provides an organization, such as a corporation, with a secure means for the organization to authorize non-members of the organization to access certain resources on the organization's network. The system also contemplates network architectures and protocols such as Ethernet, Internet Protocol, and Transmission Control Protocol. In various embodiments, the IP network 120 will support a variety of network interfaces, including 802.3ab/u/etc., Multimedia over Coax Alliance (MoCA), and 801.11.

The HFC network 150 is a broadband network that combines optical fiber and coaxial cable, technology commonly employed globally by cable television operators since the early 1990s. The fiber optic network extends from the cable operators master head end, sometimes to regional head ends, and out to a neighborhood hubsite, and finally to a fiber optic node that serves anywhere from 25 to 2000 homes. The master head end will usually have satellite dishes for reception of distant video signals as well as IP aggregation routers. Some master head ends also house telephony equipment for providing telecommunications services to the community. The regional head ends receive the video signal from the master head end and add to it the Public, Educational and/or Governmental (PEG) channels as required by local franchising authorities or insert targeted advertising that would appeal to the region. The various services are encoded, modulated and up-converted onto RF carriers, combined onto a single electrical signal and inserted into a broadband optical transmitter. This optical transmitter converts the electrical signal to a downstream optically modulated signal that is sent to the nodes. Fiber optic cables connect the head end to optical nodes in a point-to-point or star topology, or in some cases, in a protected ring topology.

In the IP video delivery system 100 shown in FIG. 1, the CMTS 130 and edge device 140 both support DOCSIS 3.0 bonding groups and include downstream channels (e.g., QAM channels as defined in DOCSIS), and the edge device 140 is a DIBA-capable EQAM. In one embodiment, the CMTS 130 provides downstream channels for the HSD (e.g., channels 1-4), and the edge device 140 provides downstream channels for the IP video (e.g., channels 5-8). In this embodiment, the CMTS 130 controls an HSD bonding group that spans the downstream channels on the CMTS 130 and the downstream channels on the edge device 140, and the edge device 140 controls an IP video bonding group that spans the downstream channels on the edge device 140 and the downstream channels on the CMTS 130. As the edge device 140 receives VBR IP video traffic, it primarily schedules delivery of the IP video traffic on its IP video bonding group using downstream channels on the edge device 140. When the IP video traffic peaks during certain times and exceeds the capacity of the IP video downstream channels on the edge device 140, the edge device 140 can forward the excess IP video traffic to the CMTS 130, but since the edge device 140 controls the IP video traffic, including the excess IP video traffic, the edge device 140 assigns the bonding group sequence number for the IP video bonding group. Upon receiving the excess IP video traffic, the CMTS 130 schedules its transmission in a queue for downstream channels appropriate for the IP video bonding group and does not need to generate the bonding group sequence number. Any DOCSIS 3.0 compliant cable modem can successfully reassemble the IP video stream using the bonding group sequence numbers. Similarly, the CMTS 130 primarily uses its downstream channels for sending best effort HSD traffic on its HSD bonding group. However, the CMTS 130 can forward the excess best effort HSD traffic to the edge device 140 when the edge device 140 downstream channels associated with the HSD bonding group are underutilized. In essence, since the IP Video bonding group and the HSD bonding group are overlapping, this allows the CMTS 130 to fill in the VBR IP video "valleys". Since this excess best effort HSD traffic use the CMTS 130 controlled HSD bonding group, the CMTS 130 assigns the bonding group sequence numbers. Upon receiving the excess best effort HSD traffic, the edge device 140 can use simple priority queuing of the excess best effort HSD traffic to fill in any unused capacity on its transmission queue for downstream channels appropriate for the HSD bonding group.

The Modular CMTS (M-CMTS) specification describes the use of a DOCSIS external physical interface (DEPI) tunnel for forwarding packets from a CMTS core to an EQAM for delivery over an HFC network. In the embodiment described above, the present invention uses a DEPI tunnel as described in the M-CMTS specification to forward the excess traffic between the CMTS 130 and edge device 140 for delivery over the HFC network 150. One skilled in the art may employ similar tunnel mechanisms to forward the excess traffic between the CMTS 130 and the edge device 140.

Since the forwarding of excess traffic can potentially overburden the edge device 140 and the CMTS 130, in the embodiment described above, the IP video delivery system 100 also includes a flow control mechanism. In one embodiment, for IP video traffic the flow control mechanism may be a simple admission control that identifies the amount of excess video traffic that can be forwarded. Thus, in the above example, the CMTS 130 may be able to statically or dynamically determine how much VBR IP video traffic that the edge device 140 can forward to it. The best effort HSD traffic is more problematic because it may sit for a while in a lower priority queue; however, a proactive flow control mechanism, such as issuing credits, can be used. Thus, in the above example, the edge device 140 issues credits to the CMTS 130 to indicate how much best effort HSD traffic it can forward on its QAM channels appropriate for HSD delivery. In various other embodiments, the flow control mechanisms to solve this problem include "credit-based" mechanisms in which the receiver issues credits for forwarding traffic to a receiver, "rate-based" mechanisms in which the receiver sends information for the transmitter to adjust the rate at which it sends to the receiver, and the like.

The customer location 160 shown in FIG. 1, in one embodiment, is the premises, such as a home, of a customer such as a cable subscriber. The customer location 160 includes a cable modem 162, IPTV 164, and customer premises equipment (CPE) 166. In various embodiments, the IPTV 164 is a device that is capable of receiving an IP video stream, and the CPE 166 is a set-top box or Digital Television (DTV) Converter (DTC).

Figure 2:
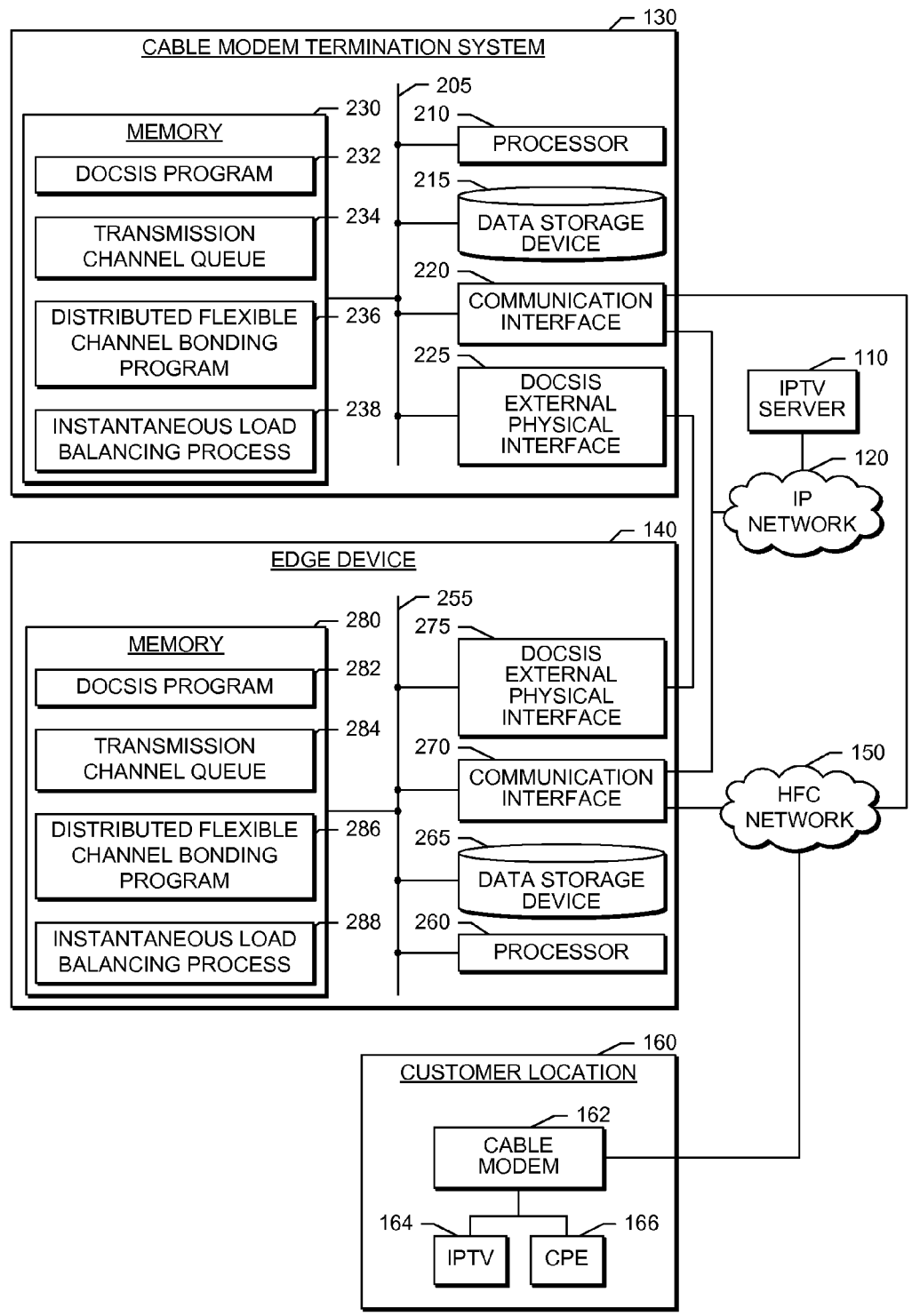
FIG. 2 is a block diagram that illustrates, in detail, one embodiment of the hardware components shown in FIG. 1.

FIG. 2 is a block diagram that illustrates, in detail, one embodiment of the hardware components shown in FIG. 1. In particular, FIG. 2 illustrates the hardware components and software comprising the CMTS 130, and edge device 140 shown in FIG. 1.

The CMTS 130, in one embodiment, is a general-purpose computing device that performs the present invention. A bus 205 is a communication medium that connects a processor 210, data storage device 215, communication interface 220, DOCSIS external physical interface (DEPI) 225, and memory 230 (such as Random Access Memory (RAM), Dynamic RAM (DRAM), non-volatile computer memory, flash memory, or the like). The communication interface 220 connects the CMTS 130 to the IP network 120, and HFC network 150. In one embodiment, the communication interface 220 utilizes downstream channels (e.g., channels 1-4) to communicate with the HFC network 150. The DEPI 225 connects the CMTS 130 to the edge device 140. In one embodiment, the implementation of the present invention, or portions thereof, on the CMTS 130 is an application-specific integrated circuit (ASIC).

The processor 210 performs the disclosed methods by executing the sequences of operational instructions that comprise each computer program resident in, or operative on, the memory 230. The reader should understand that the memory 230 may include operating system, administrative, and database programs that support the programs disclosed in this application. In one embodiment, the configuration of the memory 230 of the CMTS 130 includes a DOCSIS program 232, transmission channel queue 234, distributed flexible channel bonding program 236, and instantaneous load balancing process 238. The DOCSIS program 232 implements the DOCSIS 3.0 specification. The transmission channel queue 234 is a memory location that the CMTS 130 uses to schedule and prioritize the delivery of data on the CMTS 130 downstream channels. The distributed flexible channel bonding program 236 allocates DOCSIS flexibly sized bonding groups across multiple devices. The instantaneous load balancing process 238 balances the load across the downstream channels in a bonding group across multiple devices. The DOCSIS program 232, transmission channel queue 234, distributed flexible channel bonding program 236, and instantaneous load balancing process 238 perform the methods of the present invention disclosed in detail in FIG. 3 and FIG. 4. When the processor 210 performs the disclosed methods, it stores intermediate results in the memory 230 or data storage device 215. In another embodiment, the memory 230 may swap these programs, or portions thereof, in and out of the memory 230 as needed, and thus may include fewer than all of these programs at any one time.

The edge device 140, in one embodiment, is a general-purpose computing device that performs the present invention. A bus 255 is a communication medium that connects a processor 260, data storage device 265, communication interface 270, DOCSIS external physical interface (DEPI) 275, and memory 280 (such as Random Access Memory (RAM), Dynamic RAM (DRAM), non-volatile computer memory, flash memory, or the like). The communication interface 270 connects the edge device 140 to the IP network 120, and HFC network 150. In one embodiment, the communication interface 270 utilizes downstream channels (e.g., channels 5-8) to communicate with the HFC network 150. The DEPI 275 connects the edge device 140 to the CMTS 130. In one embodiment, the implementation of the present invention, or portions thereof, on the edge device 140 is an application-specific integrated circuit (ASIC).

The processor 260 performs the disclosed methods by executing the sequences of operational instructions that comprise each computer program resident in, or operative on, the memory 280. The reader should understand that the memory 280 may include operating system, administrative, and database programs that support the programs disclosed in this application. In one embodiment, the configuration of the memory 280 of the edge device 140 includes a DOCSIS program 282, transmission channel queue 284, distributed flexible channel bonding program 286, and instantaneous load balancing process 288. The DOCSIS program 282 implements the DOCSIS 3.0 specification. The transmission channel queue 284 is a memory location that the edge device 140 uses to schedule and prioritize the delivery of data on the edge device 140 downstream channels. The distributed flexible channel bonding program 286 allocate DOCSIS flexibly sized bonding groups across multiple devices. The instantaneous load balancing process 288 balances the load across the downstream channels in a bonding group across multiple devices. The DOCSIS program 282, transmission channel queue 284, distributed flexible channel bonding program 286, and instantaneous load balancing process 288 perform the methods of the present invention disclosed in detail in FIG. 3 and FIG. 4. When the processor 260 performs the disclosed methods, it stores intermediate results in the memory 280 or data storage device 265. In another embodiment, the memory 280 may swap these programs, or portions thereof, in and out of the memory 280 as needed, and thus may include fewer than all of these programs at any one time.

Figure 3:
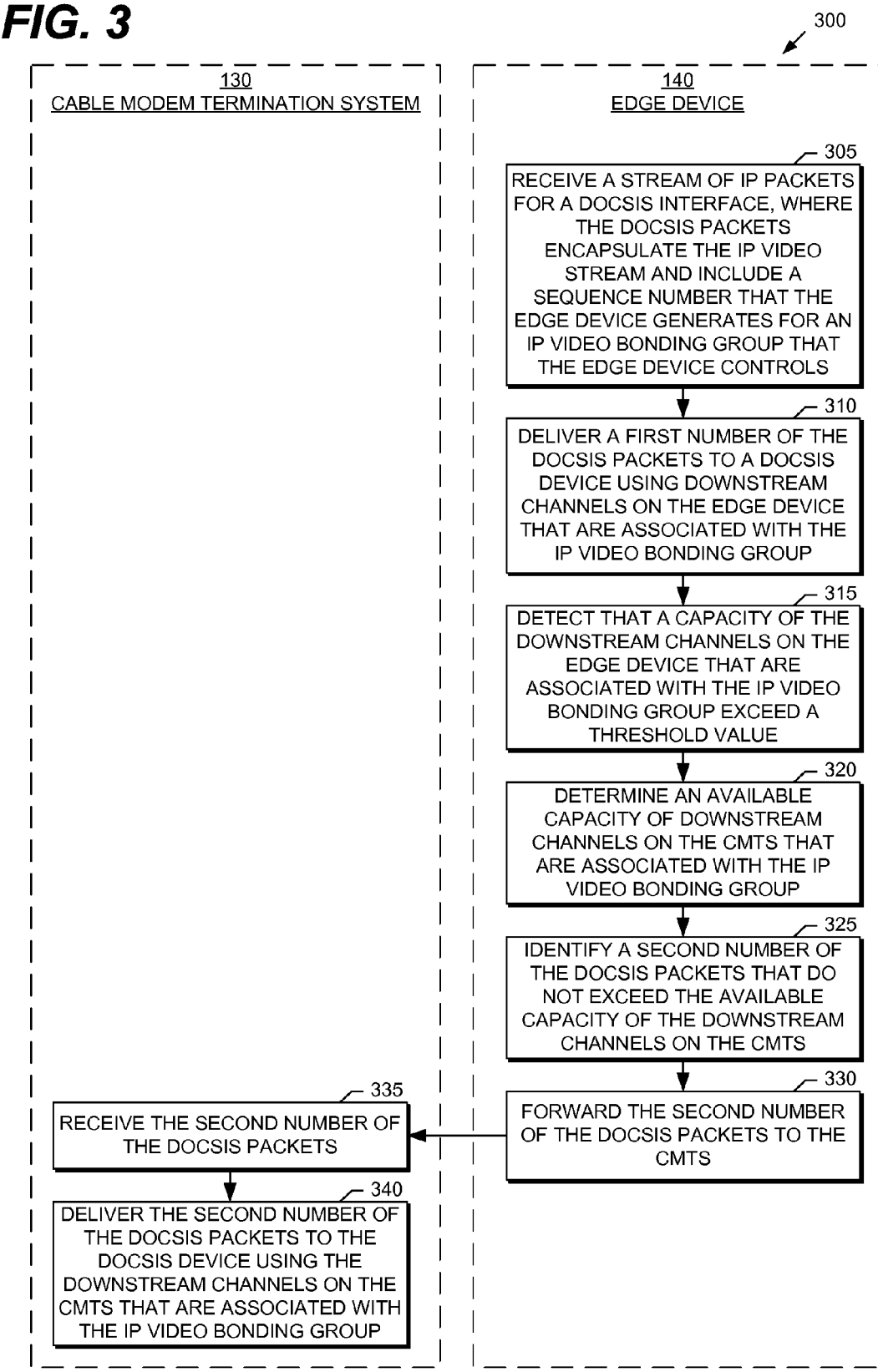
FIG. 3 is a message flow diagram that illustrates a method according to one embodiment of the present invention.

FIG. 3 is a message flow diagram that illustrates a method according to one embodiment of the present invention. In particular, FIG. 3 illustrates distributed flexible channel bonding for an edge device 140 receiving an IP video stream.

The process 300 shown in FIG. 3, with reference to FIG. 1 and FIG. 2, begins when the edge device 140 receives a stream of IP packets for its DOCSIS interface, where each DOCSIS packet encapsulates an IP video stream, and includes a sequence number that the edge device 140 generates for an IP video bonding group that the edge device 140 controls (step 305). In one embodiment, the sequence number is a bonding group sequence number that the edge device 140 assigns to each DOCSIS packet, and that a downstream DOCSIS device (e.g., a cable modem 162) can use to reconstruct the DOCSIS stream. The process 300 delivers a first number of the DOCSIS packets to a downstream DOCSIS device (e.g., a cable modem 162) using downstream channels on the edge device 140 that are associated with the IP video bonding group (e.g., channels 5-8) (step 310). The edge device 140 continually monitors the downstream channels on the edge device 140 that are associated with the IP video bonding group (e.g., channels 5-8) to detect that a capacity of those downstream channels exceed a threshold value (step 315). In one embodiment, the threshold value is a percentage of available bandwidth for the downstream channels on the edge device 140 that are associated with the IP video bonding group (e.g., channels 5-8). The edge device 140 then determines an available capacity of downstream channels on the CMTS 130 that are associated with the IP video bonding group (e.g., channels 1-4) to schedule excess IP video traffic (i.e., flow control capacity) (step 320). In one embodiment, the edge device 140 sends a request to the CMTS 130 to provide the available capacity of the downstream channels on the CMTS 130 that are associated with the IP video bonding group, and receives the available capacity in response. The process 300 then identifies a second number of the DOCSIS packets that do not exceed the available capacity of the downstream channels on the CMTS 130 that are associated with the IP video bonding group (e.g., channels 1-4) (step 325), and forwards the second number of the DOCSIS packets to the CMTS 130 (step 330). In one embodiment, a DEPI tunnel transfers the second number of the DOCSIS packet to the CMTS 130. The CMTS 130 receives the second number of the DOCSIS packets (step 335), and delivers the second number of the DOCSIS packets to the DOCSIS device using the downstream channels on the CMTS 130 that are associated with the IP video bonding group (e.g., channels 1-4) (step 340).

FIG. 4 is a message flow diagram that illustrates a method according to one embodiment of the present invention. In particular, FIG. 4 illustrates distributed flexible channel bonding for a CMTS 130 receiving HSD.

The process 400 shown in FIG. 4, with reference to FIG. 1 and FIG. 2, begins when the CMTS 130 receives a stream of IP packets for delivery for its DOCSIS interface, where each DOCSIS packet encapsulates an HSD stream, and includes a sequence number that the CMTS 130 generates for an HSD bonding group that the CMTS 130 controls (step 405). In one embodiment, the sequence number is a bonding group sequence number that the CMTS 130 assigns to each DOC- SIS packet, and that a downstream DOCSIS device (e.g., a cable modem 162) can use to reconstruct the DOCSIS stream. The process 400 delivers a first number of the DOCSIS packets to a downstream DOCSIS device (e.g., a cable modem 162) using downstream channels on the CMTS 130 that are associated with the HSD bonding group (e.g., channels 1-4) (step 410). The CMTS 130 continually monitors the downstream channels on the CMTS 130 that are associated with the HSD bonding group (e.g., channels 1-4) to detect that a capacity of those downstream channels exceed a threshold value (step 415). In one embodiment, the threshold value is a percentage of available bandwidth for the downstream channels on the CMTS 130 that are associated with the HSD bonding group (e.g., channels 1-4). The CMTS 130 then determines an available capacity of downstream channels on the edge device 140 that are associated with the HSD bonding group (e.g., channels 5-8) to schedule excess HSD traffic (i.e., flow control capacity) (step 420). In one embodiment, the CMTS 130 sends a request to the edge device 140 to provide the available capacity of the downstream channels on the edge device 140 that are associated with the HSD bonding group, and receives the available capacity in response. The process 400 then identifies a second number of the DOCSIS packets that do not exceed the available capacity of the downstream channels on the edge device 140 that are associated with the HSD bonding group (e.g., channels 5-8) (step 425), and forwards the second number of the DOCSIS packets to the edge device 140 (step 430). In one embodiment, a DEPI tunnel transfers the second number of the DOCSIS packet to the edge device 140. The edge device 140 receives the second number of the DOCSIS packets (step 435), and delivers the second number of the DOCSIS packets to the DOCSIS device using the downstream channels on the edge device 140 that are associated with the HSD bonding group (e.g., channels 5-8) (step 440).

The prior art flexible channel bonding scheme with instantaneous load balancing enables an IP video delivery system to fully utilize VBR video streams for IP video delivery over cable over a single CMTS. The present invention describes the use of multiple logical bonding groups, each controlled by a separate device, to enable the flexible channel bonding scheme to be implement in a distributed manner across multiple CMTS and/or DIBA-capable EQAM devices. Thus, the present invention permits separate transmitting entities of DOCSIS bonding groups (e.g., the CMTS 130 and edge device 140) to share bandwidth on the same downstream channels. In other embodiments, the present invention may support other types of data and services other than VBR video streams and HSD, and may support a multitude of devices, not just the two devices disclosed in the embodiments. Furthermore, the logical bonding groups need not cover identical channels, but may also be non-overlapping bonding groups as described in the prior art Although the disclosed embodiments describe a fully functioning method and system for IP video delivery, the reader should understand that other equivalent embodiments exist. Since numerous modifications and variations will occur to those reviewing this disclosure, the method and system for IP video delivery is not limited to the exact construction and operation illustrated and disclosed. Accordingly, this disclosure intends all suitable modifications and equivalents to fall within the scope of the claims.

I claim:

1. A method, comprising:
receiving Internet Protocol (IP) packets on a first device for delivery over a Data Over Cable Service Interface Specification (DOCSIS) interface, wherein each DOCSIS packet of a plurality of DOCSIS packets encapsulates IP data from the IP packets and includes a sequence number that the first device generates for a bonding group that the first device controls;
delivering a first number of the DOCSIS packets to a DOCSIS device using first downstream channels on the first device, wherein the first downstream channels are associated with the bonding group;
detecting that a capacity of the first downstream channels exceed a threshold value;
determining an available capacity of second downstream channels on a second device, wherein the second downstream channels are associated with the bonding group;
identifying a second number of the DOCSIS packets that do not exceed the available capacity of the second downstream channels on the second device; and
forwarding the second number of the DOCSIS packets from the first device to the second device,
wherein the second device delivers the second number of the DOCSIS packets to the DOCSIS device using the second downstream channels.

2. The method of claim 1, wherein the IP data includes at least one of an IP video stream, best effort high speed data (HSD) traffic, web surfing traffic, adaptive streaming, video-on-demand, and audio-on-demand.

3. The method of claim 1, wherein the bonding group bonds the first downstream channels on the first device, and the second downstream channels on the second device, and wherein each first downstream channel and each second downstream channel is a DOCSIS QAM channel.

4. The method of claim 1, wherein the delivering of the first number of the DOCSIS packets further comprises:
assigning the first number of the DOCSIS packets to one of the first downstream channels;
adding the first number of the DOCSIS packets to a transmission queue on the first device; and
transmitting the first number of the DOCSIS packets to the DOCSIS device.

5. The method of claim 1, wherein the threshold value is a percentage of available bandwidth for the first downstream channels.

6. The method of claim 1, wherein the determining of the available capacity further comprises:
requesting the available capacity of the second downstream channels on the second device; and
receiving the available capacity of the second downstream channels on the second device.

7. The method of claim 6, further comprising:
receiving a credit that indicates the available capacity of the second downstream channels on the second device.

8. The method of claim 6, further comprising:
receiving adjustment information that indicates a change to the available capacity of the second downstream channels on the second device.

9. The method of claim 1, wherein the forwarding of the second number of the DOCSIS packets further comprises:
configuring a DOCSIS External Physical Interface (DEPI) tunnel between the first device and the second device; and
sending the second number of the DOCSIS packets to the second device on the DEPI tunnel.

10. An IP video delivery system that includes a first device and a second device, comprising:
a first memory device resident in the first device;
a first processor disposed in communication with the first memory device, the first processor configured to:

receive Internet Protocol (IP) packets on a first device for delivery over a Data Over Cable Service Interface Specification (DOCSIS) interface, wherein each DOCSIS packet of a plurality of DOCSIS packets encapsulates IP data from the IP packets and includes a sequence number that the first device generates for a bonding group that the first device controls;

deliver a first number of the DOCSIS packets to a DOCSIS device using first downstream channels on the first device, wherein the first downstream channels are associated with the bonding group;

detect that a capacity of the first downstream channels exceed a threshold value;

determine an available capacity of second downstream channels on a second device, wherein the second downstream channels are associated with the bonding group;

identify a second number of the DOCSIS packets that do not exceed the available capacity of the second downstream channels on the second device; and forward the second number of the DOCSIS packets from the first device to the second device;

a second memory device resident in the second device; and a second processor disposed in communication with the second memory device, the second processor configured to:

deliver the second number of the DOCSIS packets to the DOCSIS device using the second downstream channels.

11. The IP video delivery system of claim 10, wherein the IP data includes at least one of an IP video stream, best effort high speed data (HSD) traffic, web surfing traffic, adaptive streaming, video-on-demand, and audio-on-demand.

12. The IP video delivery system of claim 10, wherein the bonding group bonds the first downstream channels on the first device, and the second downstream channels on the second device, and wherein each first downstream channel and each second downstream channel is a DOCSIS QAM channel.

13. The IP video delivery system of claim 10, wherein to deliver the first number of the DOCSIS packets, the first processor is further configured to:

assign the first number of the DOCSIS packets to one of the first downstream channels;

add the first number of the DOCSIS packets to a transmission queue on the first device; and transmit the first number of the DOCSIS packets to the DOCSIS device.

14. The IP video delivery system of claim 10, wherein the threshold value is a percentage of available bandwidth for the first downstream channels.

15. The IP video delivery system of claim 10, wherein to determine the available capacity, the first processor is further configured to:

request the available capacity of the second downstream channels on the second device;

receive the available capacity of the second downstream channels on the second device.

16. The IP video delivery system of claim 15, wherein the first processor is further configured to:

receive a credit that indicates the available capacity of the second downstream channels on the second device.

17. The IP video delivery system of claim 15, wherein the first processor is further configured to:

receive adjustment information that indicates a change to the available capacity of the second downstream channels on the second device.

18. The IP video delivery system of claim 10, wherein to forward the second number of the DOCSIS packets, the first processor is further configured to:

configure a DOCSIS External Physical Interface (DEPI) tunnel between the first device and the second device;

send the second number of the DOCSIS packets to the second device on the DEPI tunnel.

19. The IP video delivery system of claim 10, wherein to deliver the second number of the DOCSIS packets, the second processor is further configured to:

assign the second number of the DOCSIS packets to one of the second downstream channels;

add the second number of the DOCSIS packets to a transmission queue on the second device; and transmit the second number of the DOCSIS packets to the DOCSIS device.

20. A non-transitory computer-readable medium, comprising computer-executable instructions that, when executed on a computing device, perform steps of:

receiving Internet Protocol (IP) packets on a first device for delivery over a Data Over Cable Service Interface Specification (DOCSIS) interface, wherein each DOCSIS packet of a plurality of DOCSIS packets encapsulates IP data from the IP packets and includes a sequence number that the first device generates for a bonding group that the first device controls;

delivering a first number of the DOCSIS packets to a DOCSIS device using first downstream channels on the first device, wherein the first downstream channels are associated with the bonding group;

detecting that a capacity of the first downstream channels exceed a threshold value;

determining an available capacity of second downstream channels on a second device, wherein the second downstream channels are associated with the bonding group;

identifying a second number of the DOCSIS packets that do not exceed the available capacity of the second downstream channels on the second device; and forwarding the second number of the DOCSIS packets from the first device to the second device, wherein the second device delivers the second number of the DOCSIS packets to the DOCSIS device using the second downstream channels.

* * * * *